United States Patent [19]
van der Plaats

[11] Patent Number: 5,731,891
[45] Date of Patent: Mar. 24, 1998

[54] OPTICAL AMPLIFIER

[75] Inventor: Johannes Christiaan van der Plaats, Maarsen, Netherlands

[73] Assignee: Lucent Technologies Inc., Murray Hill, N.J.

[21] Appl. No.: 604,045

[22] Filed: Feb. 20, 1996

[30] Foreign Application Priority Data

Feb. 20, 1995 [GB] United Kingdom ............ 9503257

[51] Int. Cl.$^6$ .............. H01J 5/16; G02B 6/28; H01S 3/02
[52] U.S. Cl. ............ 359/341; 359/143; 359/337
[58] Field of Search ............... 359/337, 341, 359/143

[56] References Cited

U.S. PATENT DOCUMENTS

| | | | |
|---|---|---|---|
| 5,231,529 | 7/1993 | Kaede | 359/124 |
| 5,280,549 | 1/1994 | Barnard et al. | 385/15 |
| 5,400,418 | 3/1995 | Pearson et al. | 385/6 |
| 5,404,413 | 4/1995 | Delavaux et al. | 359/341 |
| 5,563,733 | 10/1996 | Matsuda et al. | 359/341 |
| 5,572,357 | 11/1996 | Nakazato et al. | 359/341 |
| 5,633,741 | 5/1997 | Giles | 359/124 |

FOREIGN PATENT DOCUMENTS 5227102  9/1993  Japan.

OTHER PUBLICATIONS

Barnard et al., IEEE Photonics Tech. Lett., vol. 4, #8, pp. 911–913, Aug. 1992.
Van der Plaats et al, Proc. 21st Europ. Conf. Opt. Commun., Sep. 17, 1995, pp. 363–366; abst. only herewith.
Van der Plaats et al, OFC '95, vol. 8, Feb. 26, 1995, pp. 64–65; abst only herewith.

*Primary Examiner*—Nelson Moskowitz
*Attorney, Agent, or Firm*—Lester H. Birnbaum; Julio A. Garceran

[57] ABSTRACT

The invention relates to an optical amplifier comprising an input and a beamsplitter connected by a first optical fiber arranged to transmit an optical signal from said input to said beamsplitter via an optical amplifying means and an optical isolator. The optical amplifier includes a second optical fiber connected between said input and said beam splitter and is arranged to transmit a second signal from said beamsplitter to said input. Preferably, the optical amplifier also incorporates an optical element which is adapted to prevent any signal from said input propagating along said second optical fiber and to prevent any signal from said second optical fiber from propagating along said first optical fiber.

9 Claims, 1 Drawing Sheet

OPTICAL AMPLIFIER

TECHNICAL FIELD

The present invention relates to an optical amplifier for use in an optical fiber communication system.

Optical fiber communication systems are widely used for the transmission of optical data signals such as those utilized in, for example, cable television systems. Optical amplifiers are essential in commercial optical fiber communication systems because of the large distances travelled by, or the high beam-split count of, optical data signals in such systems and the resultant attenuation of the signals. Optical amplifiers are also required in commercial optical communication systems because optical data signals produced by the operators of such systems have a large bandwidth.

Return signals in two-way optical communication systems are not commonly required to be as powerful as the aforementioned optical data signals as they commonly have a narrow bandwidth in comparison to the aforementioned signals.

One problem encountered in transmitting optical data signals in a predetermined direction along an optical fiber is the deterioration in signal quality due to the effect of so called multiple reflection induced Relative Intensity Noise (RIN), resulting from the signals reflecting from discrete reflection points and/or Raleigh scattering within an optical fiber. The magnitude of the RIN signals produced by multiple reflections between reflection points on either side of the amplifying means in an optical amplifier is proportional to the gain (Gd) of the amplifying means in the predetermined direction times the gain (Gu) of the amplifying means in the reverse direction. As the light is transmitted through the same amplifying means when travelling in both directions along a single optical fiber in the aforementioned optical amplifier the gain in both directions is the same (Gd=Gu).

One commonly used optical amplifier is an optical fiber amplifier which comprises an optical fiber doped with an optically active substance such as Erbium impurities. The impurities are activated to amplify a data signal by pumping the Erbium doped fiber, in a known manner, with laser light of a lower wavelength than that of the optical data signals to be amplified.

A known method of reducing the effect of multiple reflection induced RIN in an amplified optical signal is to incorporate an optical element known as an optical isolator in the optical fiber path containing the amplifying means. The optical isolator is adapted to transmit data signals in a predetermined direction while attenuating any back scattered noise signals propagating along the optical fiber in the opposite direction to the optical data signals.

However, it is becoming increasingly important for optical fiber communication systems to facilitate communications in both directions along a fiber thus allowing the systems to be used in, for example, telephone or interactive television systems. If the aforementioned optical amplifier were to be used in such an optical fiber communication system, two-way communication could only be achieved by removing the optical isolator, which would result in an increase in multiple reflection induced RIN.

It is an object of the present invention to provide an optical amplifier which addresses the problems discussed above.

According to the present invention there is provided an optical amplifier comprising an input and a beamsplitter connected by a first optical fiber arranged to transmit a first optical signal from said input to said beamsplitter via an amplifying means and an optical isolator. A second optical fiber is connected between said input and said beam splitter and is arranged to transmit a second signal from said beam splitter to said input.

As the second optical fiber may not contain an amplifying means or may contain a low gain amplifying means (Gu<Gd compared with Gu=Gd for a single fiber amplifier without an isolator) it is an advantage of the present invention that the effect of multiple reflection induced RIN can be minimized, while facilitating two-way communication.

BRIEF DESCRIPTION OF THE DRAWINGS

An embodiment of the present invention will now be described, by way of example, with reference to the accompanying drawings in which.

DETAILED DESCRIPTION

Figure 1:
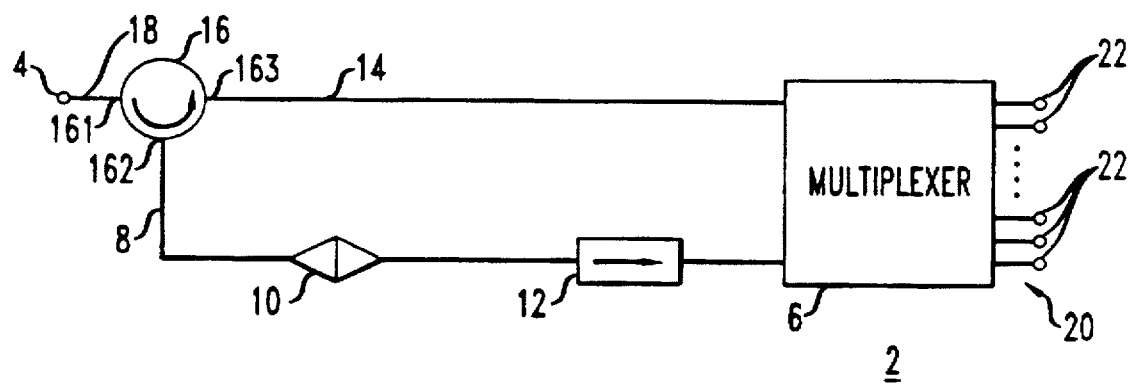
FIG. 1 illustrates a schematic view of an optical amplifier in accordance with the present invention.

With reference to FIG. 1 there is illustrated an optical amplifier 2 comprising an input 4 and a beam splitter in the form of a 2/N multiplexer 6, which are connected via an optical element in the form of a three port optical circulator 16 (such as the CR1500 series optical circulator manufactured by JDS FITEL Inc.) and a first optical fiber 8. The first optical fibre 8 includes an optical amplifying means 10, arranged to amplify optical data signals transmitted along the optical fiber 8 in a predetermined direction, and an optical isolator 12. The 2/N multiplexer 6 comprises N ports on its output side, each port being connected to an optical fiber 20. Signals transmitted along any one of these N fibers 20 are received by the multiplexer 6 and propagated along any fibers connected to the 2 port side of the multiplexer 6. However, any such signals propagated into the optical fiber 8 will be attenuated by the isolator 12. Thus the amplifier 2 is arranged to transmit the amplified optical data signals in said predetermined direction along the optical fiber 8 while attenuating any signals propagating along the optical fiber 8 in the direction opposite to the optical data signals.

The optical amplifier 2 also incorporates a second optical fiber 14 connected between the input 4 and the multiplexer 6, via the three port optical circulator 16.

The three port optical circulator 16 comprises a fist port 161 connected to an optical fiber 18 which is connected to the input 4 of the amplifier 2, a second port 162 which is connected to the first optical fiber 8 and a third port 163 which is connected to the second optical fiber 14.

The optical circulator 16 is arranged to direct light entering the circulator 16 through the fist port 161 out through the second port 162 for propagation along the first optical fiber 8 connected thereto, while preventing this light from being transmitted through the third port 163 connected to the second optical fiber 14. The optical circulator 16 is further arranged to direct light entering the circulator 16 through the third port 163 out through the first port 161 for propagation along the optical fiber 18 connected thereto, while preventing this light from being transmitted through the second port 162 connected to the first optical fiber 8.

Now looking at the multiplexer 6, one side of the multiplexer 6 is connected to both the first and second optical fibers 8, 14 and the other side of the multiplexer 6 is connected to N optical fibers 20, as discussed above, each of which is connected to an output 22, which is accessible by a user of the communication system incorporating the optical amplifier 2.

Any signal propagated along the optical fiber 18 from the input 4 of the amplifier 2 is received by the optical circulator 16, though the fist port 161 of the circulator 16, and transmitted through the second port 162 of the optical circulator 16 for propagation along the first optical fiber 8 to the two port side of the multiplexer 6.

Any signal received at the two port side of the multiplexer 6 is split into N, commonly of the order of 2 to 32, signals of equal magnitude by the multiplexer 6, and each signal is transmitted along a respective one of the N optical fibers 20 connected to the N port side of the multiplexer 6.

Likewise, any signal transmitted along any one of the fibers 20, by a user of the communication system, is received at the N port side of the multiplexer 6. The multiplexer 6 is adapted such that any signal received at the N port side is split into signals of equal magnitude, one being transmitted along the first optical fiber 8 and another being transmitted along the second optical fiber 14.

Although, the signal transmitted along the first optical fiber 8 is attenuated by the optical isolator 12, the signal transmitted along the second optical fiber 14 is received by the optical circulator 16, through the third port 163 of the circulator 16, and transmitted through the first port 161 of the circulator 16 for continued propagation along the optical fiber 18 to the input 4 of the amplifier 2.

Thus interactive communication is enabled in an optical communication system utilizing an optical amplifier in accordance with the present invention. Also, the effect of any signals propagating along any of the fibers 20, and received at the N port side of the multiplexer 6, on the amplification characteristics, such as gain and noise figures, of data signals transmitted along the first optical fiber 8 is minimized, through the utilization of the optical isolator 12 in the first optical fiber 8. Also, the effect of multiple reflection induced RIN is minimized due to the use of a second optical fiber 14 for return signals which does not contain an amplifying means.

Figure 2:
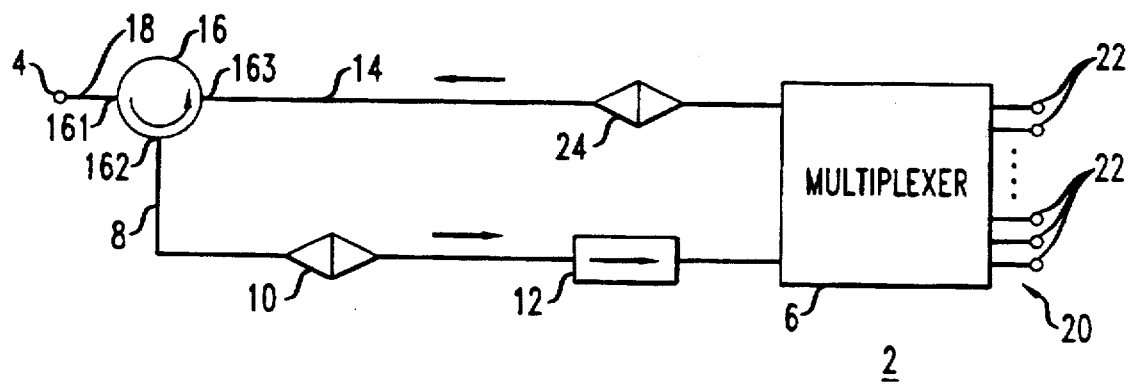
FIG. 2 illustrates the optical amplifier of FIG. 1 adapted in order to amplify signals propagating in either direction through the amplifier.

With reference to FIG. 2 there is illustrated an optical amplifier 2 incorporating an additional amplifying means 24 located in the second optical fiber 14, thus amplifying signals transmitted by a user of the optical communications system along the second optical fiber 14. The amplifying means 24 will be a low gain amplifying means (Gu<Gd) thus not increasing the adverse effects of multiple reflection induced RIN within the optical amplifier 2. Also there is no need for an optical isolator in the optical fiber 14, as the optical circulator 16 will prevent the transmission of optical signals propagating from input 4 along fiber 18 into the optical fibre 14.

If an optical amplifier in accordance with the present invention is incorporated in an interactive optical fiber communication system, the input 4 of the optical amplifier 2 would be connected to both a transmitter (not shown) for transmitting wide band optical data signals for transmission to the users of the system located at the outputs 22 of the optical fibers 20, and to an optical receiver (not shown) for receiving return signals produced by the users of the optical communication system and transmitted along selected ones of the optical fibers 20 and the second optical fibre 14. Also, in more complex optical fiber communication systems, the N optical fibers 20 connected to the multiplexer 6 may each be connected to an additional multiplexer (not shown), depending on the size and complexity of the optical communication system with which the amplifier 2 is to be used.

The use in optical amplifiers in accordance with the present invention of a single optical circulator, as opposed to two or more optical circulators as utilized in other known optical amplifiers, is advantageous due to the extremely high cost of optical circulators.

The invention claimed is:

1. An optical amplifier comprising:

an input;

an optical element having at least three ports, said optical element arranged to receive optical data signals from said input at a first port and direct said optical data signals to a second port, said optical element arranged to receive return optical signals at said third port and direct said return optical signals through said first port to said input;

a beamsplitter having a plurality of outputs;

a first optical path optically coupled to said second port of said optical element to transmit said optical data signals from said first port to said beamsplitter, said beamsplitter arranged to output said optical data signals through said plurality of outputs;

a first amplifying circuitry and an optical isolator optically coupled between said second port and said beamsplitter on said first optical path; and a second optical path optically connected between said third port and said beamsplitter to transmit said return optical signals from at least one of said plurality of outputs of said beamsplitter to said third port of said optical element which directs said outgoing optical signals out through said first port to said input.

2. An optical amplifier according to claim 1, further comprising a second amplifying circuitry coupled to said second optical path.

3. An optical amplifier according to claim 2, wherein the gain of said first amplifying circuitry is greater than the gain of said second amplifying circuitry.

4. An optical amplifier according to claim 1, wherein said optical element is a single three port optical circulator.

5. An optical amplifier according to claim 1, wherein said beam splitter is a 2/N multiplexer.

6. An optical amplifier according to claim 1, wherein said amplifying circuitry is an Erbium doped optical fiber.

7. An optical amplifier comprising:

an input;

a beamsplitter having a plurality of outputs;

a first optical path optically coupled to transmit optical data signals from said input to said plurality of outputs of said beamsplitter;

amplifying and isolating circuitry optically coupled between said input and said beamsplitter on said first optical path to amplify and isolate said optical data signals on said first optical path from said input to said plurality of outputs of said beamsplitter; and a second optical path optically connected between said input and said beamsplitter to transmit return optical signals from said plurality of outputs of said beamsplitter to said input.

8. A method of amplifying optical signals comprising the steps of:

receiving optical data signals at an input;

providing said optical data signals to a first optical path;

amplifying and isolating said optical data signals on said first optical path from said input to a beamsplitter;

providing said optical data signals to a plurality of outputs of said beamsplitter;

receiving return optical signals from at least one of said plurality of outputs of said beamsplitter;

providing said return optical signals to a second optical path from said beamsplitter to said input; and providing said return optical signals from said second optical path to said input.

9. The method of claim 8 wherein said steps of providing said return optical signals further including providing said return optical signals without isolating said return optical signals.

* * * * *